United States Patent
Suga

(10) Patent No.: US 9,083,432 B2
(45) Date of Patent: Jul. 14, 2015

(54) RELAY METHOD, AND RELAY APPARATUS IN WIRELESS COMMUNICATION SYSTEM

(75) Inventor: Junichi Suga, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 463 days.

(21) Appl. No.: 12/883,689

(22) Filed: Sep. 16, 2010

(65) Prior Publication Data

US 2011/0064020 A1    Mar. 17, 2011

(30) Foreign Application Priority Data

Sep. 17, 2009 (JP) ................. 2009-215127

(51) Int. Cl.
| | |
|---|---|
| H04W 72/12 | (2009.01) |
| H04W 88/04 | (2009.01) |
| H04B 7/26 | (2006.01) |
| H04B 7/155 | (2006.01) |

(52) U.S. Cl.
CPC .............. *H04B 7/2606* (2013.01); *H04B 7/155* (2013.01)

(58) Field of Classification Search
None
See application file for complete search history.

(56) References Cited

U.S. PATENT DOCUMENTS

| | | | | |
|---|---|---|---|---|
| 7,792,067 | B2 * | 9/2010 | Sheu et al. ..................... | 370/311 |
| 8,285,296 | B2 * | 10/2012 | Cai ................................ | 455/450 |
| 2007/0060146 | A1 * | 3/2007 | Won et al. ...................... | 455/445 |
| 2008/0045174 | A1 * | 2/2008 | Chen et al. ................... | 455/187.1 |
| 2008/0108369 | A1 * | 5/2008 | Visotsky et al. ............... | 455/455 |
| 2008/0151802 | A1 * | 6/2008 | Sheu et al. ..................... | 370/311 |
| 2008/0165719 | A1 * | 7/2008 | Visotsky ........................ | 370/315 |
| 2008/0186950 | A1 * | 8/2008 | Zhu et al. ....................... | 370/350 |
| 2008/0316954 | A1 * | 12/2008 | Zheng ............................ | 370/315 |
| 2009/0059838 | A1 * | 3/2009 | Min et al. ...................... | 370/315 |
| 2009/0117901 | A1 * | 5/2009 | Zhao et al. ..................... | 455/436 |

FOREIGN PATENT DOCUMENTS

| | | |
|---|---|---|
| JP | 2007-184935 A | 7/2007 |
| JP | 2008-177969 A | 7/2008 |

OTHER PUBLICATIONS

IEEE Computer Society, et al., "IEEE Std 802.16j-2009", Jun. 12, 2009. (Document pages have been uploaded in four parts (pp. 1 to 310) due to the size of document.).

* cited by examiner

*Primary Examiner* — Gregory Sefcheck
*Assistant Examiner* — Jenkey Van
(74) *Attorney, Agent, or Firm* — Arent Fox LLP

(57) ABSTRACT

A relay station performing wireless communications with a plurality of other relay stations and at least one wireless terminal, the relay station including: a scheduler, when at least one of the relay station and the other relay stations receives data from a wireless terminal controlled thereby, generating a first map such that the data is exchanged among the relay station and the other relay stations during a first period, and generating a second map such that the data as received during the first period is transmitted to the controlled wireless terminal during a second period.

20 Claims, 14 Drawing Sheets

RELAY METHOD, AND RELAY APPARATUS IN WIRELESS COMMUNICATION SYSTEM

CROSS-REFERENCE TO RELATED APPLICATION

This application is based upon and claims the benefit of priority from the prior Japanese Patent Application No. 2009-215127 filed on Sep. 17, 2009, the entire contents of which are incorporated herein by reference.

FIELD

The present invention relates to a wireless communication system including a plurality of relay stations which communicate with the other relay stations and wireless terminals.

BACKGROUND

Multicast and broadcast service in IEEE802.16j standard defines a relay method of multicast data in a system including relay stations arranged between a base station and wireless terminals. The base station receives multicast data via a wired network, and then wirelessly transmits the multicast data to the relay station controlled thereby. The base station and the relay stations work on the same frequency, and broadcasts the data to the wireless terminals thereof.

Wireless ad-hoc networks where data is wirelessly relayed for communications without wired line have been recently studied. FIG. 14 illustrates a wireless ad-hoc network in a related art. The network in FIG. 14 includes relay stations 101-103 and wireless terminals 111-114. Each of the relay stations 101-103 relays data transmitted by one of the wireless terminals 111-114 and then transmits the data to another of the wireless terminals 111-114. If the wireless terminal 114 transmits data to the wireless terminal 111, the relay stations 101 and 103 relay the data of the wireless terminal 114, and then wirelessly transmit the data to the wireless terminal 111. There are cases where the wireless terminals 111-114 themselves relay data.

If the IEEE802.16j standard (IEEE Std 802.16-2009) is applied to multicast communication in the wireless ad-hoc network, all the relay stations 101-103 can broadcast data to the wireless terminals 111-114 on the same frequency. For example, the relay station 101 may perform an operation corresponding to a base station complying with IEEE802.16j, thereby scheduling the multicast data. The wireless terminal 114 may serve as a terminal transmitting the multicast data.

Upon receiving the multicast data from the wireless terminal 114, the relay station 101 performs a scheduling operation such that the multicast data is broadcasted by the relay stations 101-103 on the same frequency. The relay station 101 transmits scheduling information and the data of the wireless terminal 114 to the other relay stations 102 and 103. The relay station 101 broadcasts the multicast data to the wireless terminals 113 and 114, controlled thereby, on the same frequency in accordance with the scheduling information generated by the relay station 101. The relay stations 102 and 103 broadcast the multicast data to the wireless terminals 111 and 112 respectively controlled thereby, on the same frequency in accordance with the scheduling information received from the relay station 101. In this way, the efficient use of wireless resources is improved, and reception quality of each of the wireless terminals 111-114 is thus improved.

Japanese Laid-open Patent Publication No. 2008-177969 describes an orthogonal frequency division multiple access (OFDMA) wireless system that autonomously performs interference free wireless relaying. Japanese Laid-open Patent Publication No. 2007-184935 describes an apparatus that relays transparently a signal in a multi-hop relay cellular network.

SUMMARY

According to an aspect of the invention, a relay station performing wireless communications with a plurality of other relay stations and at least one wireless terminal, the relay station including: a scheduler, when at least one of the relay station and the other relay stations receives data from a wireless terminal controlled thereby, generating a first map such that the data is exchanged among the relay station and the other relay stations during a first period, and generating a second map such that the data as received during the first period is transmitted to the controlled wireless terminal during a second period.

The object and advantages of the invention will be realized and attained by at least the elements, features, and combinations particularly pointed out in the claims. It is to be understood that both the foregoing general description and the following detailed description are exemplary and explanatory and are not restrictive of the invention, as claimed.

DESCRIPTION OF EMBODIMENTS

In the figures, dimensions and/or proportions may be exaggerated for clarity of illustration. It will also be understood that when an element is referred to as being "between" two elements, it may be the only element layer between the two elements, or one or more intervening elements may also be present.

A wireless ad-hoc network has a problem that wireless resources are not used in an efficient manner in multicast communications.

Figure 14:
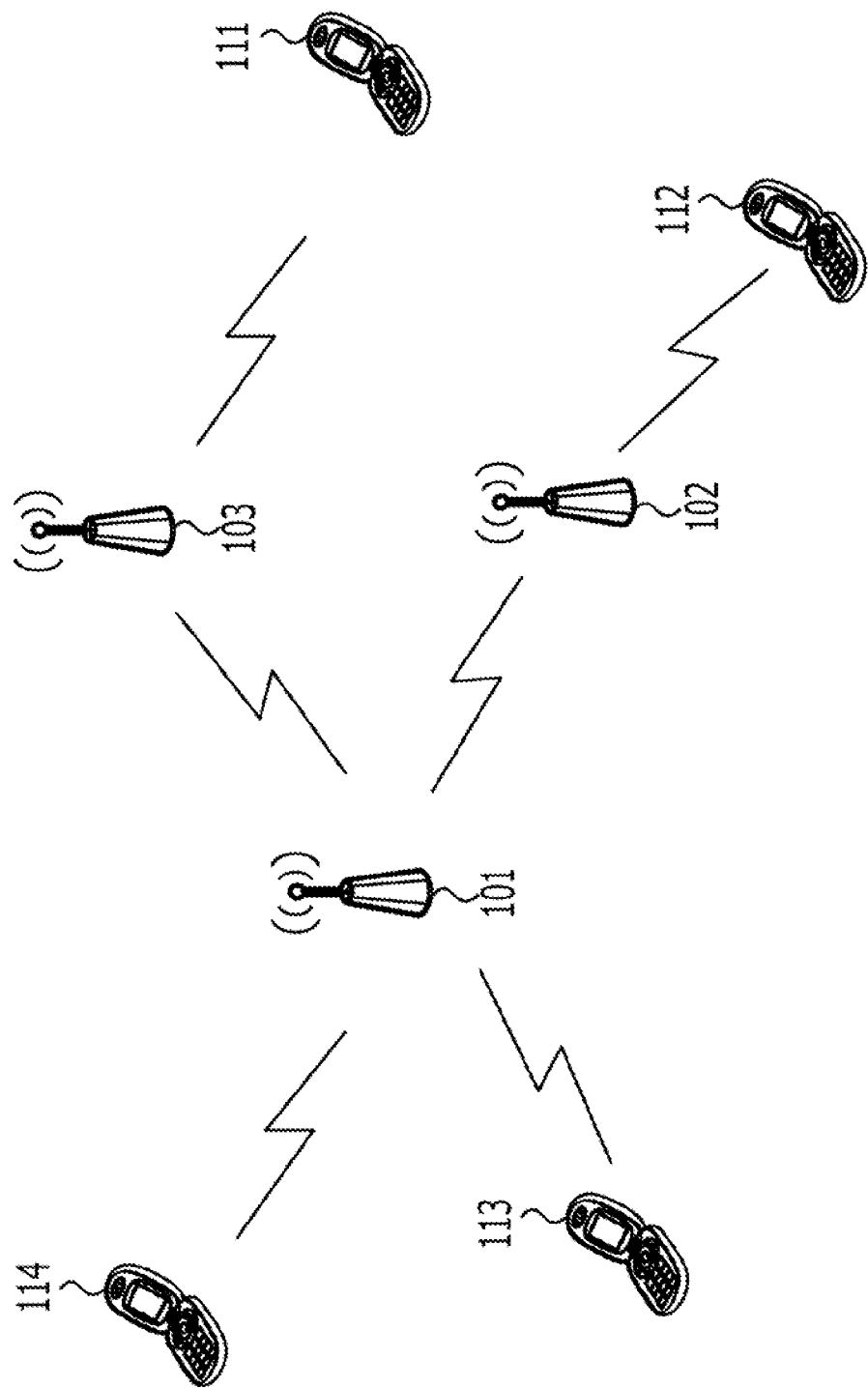
FIG. 14 illustrates a wireless ad-hoc network.

For example, the wireless terminal 112 may now transmit multicast data as illustrated in FIG. 14. The multicast data of the wireless terminal 112 is transmitted to the relay station 101, serving as a base station, via the relay station 102.

Upon receiving the multicast data via the relay station 102, the relay station 101 performs a scheduling operation such that the multicast data is broadcast from the relay stations 101-103 and transmits scheduling information and the multicast data to the remaining relay stations 102 and 103.

Although the relay station 102 has received the multicast data from the wireless terminal 112, the relay station 102 receives again the multicast data from the relay station 101. More specifically, the relay station 102 receives the multicast data from the wireless terminal 112, transmits the same multicast data to the relay station 101, and then receives the same multicast data from the relay station 101. This wireless communication wastes wireless resources.

The technique discussed herein has been developed in view of the above problem, and it is an object of the technique to provide a relay station that effectively uses wireless resources.

A first embodiment is described below with reference to the drawings.

Figure 1:
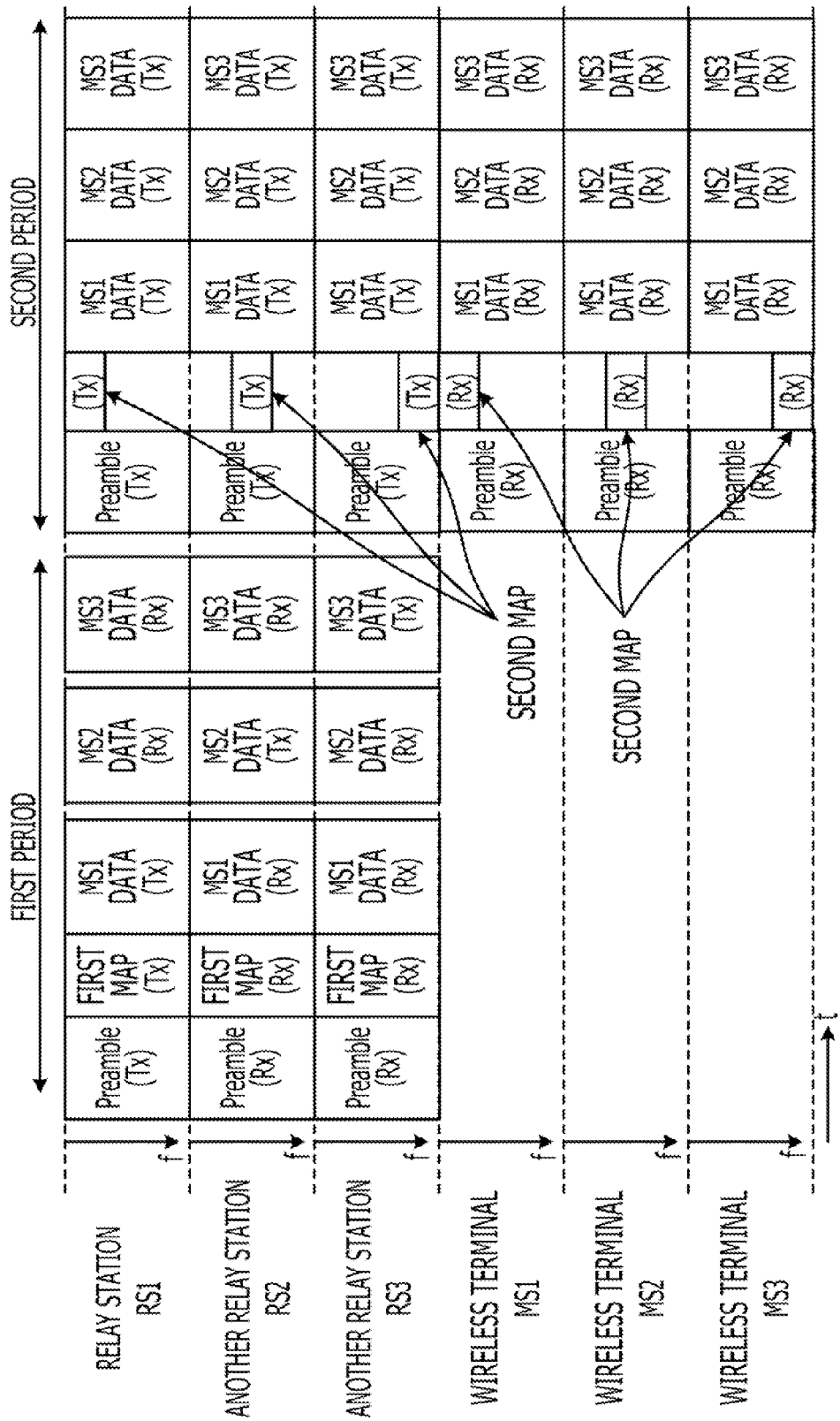
FIG. 1 illustrates a frame structure of relay stations according to a first embodiment.

FIG. 1 illustrates a frame structure of relay stations of a first embodiment. FIG. 1 illustrates frames of a relay station RS1, other relay stations RS2 and RS3, and wireless terminals MS1-MS3. The relay station RS1 and the other relay stations RS2 and RS3 are installed at locations that allow these relay stations to communicate with each other. The wireless terminal MS1 is under the control of the relay station RS1, and can communicate with the relay station RS1. The wireless terminal MS2 is under the control of the relay station RS2, and can communicate with the relay station RS2. The wireless terminal MS3 is under the control of the relay station RS3, and can communicate with the relay station RS3. The label Tx indicates that the relay station RS1-RS3 and the wireless terminals MS1-MS3 transmit data, and the label Rx indicates that the relay station RS1-RS3 and the wireless terminals MS1-MS3 receive data.

The relay station RS1 includes a scheduler. If at least one of the relay stations RS1, RS2, and RS3 receives data from the wireless terminals MS1-MS3 controlled by the relay stations RS1-RS3, the scheduler in the relay station RS1 generates a first map such that the relay station RS1 and the other relay stations RS2 and RS3 transmit the received data to each other during a first period. The scheduler generates a second map such that the relay station RS1 transmits the data, received during the first period, to the wireless terminal MS1 controlled by the relay station RS1 during a second period.

The other relay stations RS2 and RS3 include schedulers. The schedulers in the other relay stations RS2 and RS3 receive from the relay station RS1 the first map generated by the relay station RS1. During the second period, the scheduler in the other relay stations RS2 and RS3 generates the second map such that the data received during the first period is transmitted to the wireless terminals MS2 and MS3.

The relay station RS1 and the other relay stations RS2 and RS3 may respectively receive the multicast data from the wireless terminals MS1-MS3. The scheduler in the relay station RS1 generates the first map such that the relay station RS1 and the other relay stations RS2 and RS3 transmit the received multicast data from the wireless terminals MS1-MS3 to each other during the first period. The scheduler in the relay station RS1 is not illustrated in FIG. 1. The scheduler in the relay station RS1 generates the first map in response to a request made by one of the other relay stations RS2 and RS3 that the multicast data be transmitted by the one of the other relay stations RS2 and RS3 or in response to a reception by the relay station RS1 of the multicast data from the wireless terminal MS1 controlled by the relay station RS1, although the request and the reception are not illustrated in FIG. 1.

The first map generated by the relay station RS1 is transmitted to the other relay stations RS2 and RS3, and the other relay stations RS2 and RS3 receive the first map as illustrated in FIG. 1. The relay station RS1 and the other relay stations RS2 and RS3 thus exchange with each other the multicast data received from the respective wireless terminals MS1-MS3 in accordance with the first map.

For example, the relay station RS1 transmits the multicast data received from the wireless terminal MS1 controlled by the relay station RS1 to the other relay stations RS2 and RS3 during an MS1 data segment of the first period as illustrated in FIG. 1. The relay station RS2 transmits the multicast data received from the wireless terminal MS2 controlled by the relay station RS2 to the other relay stations RS1 and RS3 during an MS2 data segment of the first period. The relay station RS3 transmits the multicast data received from the wireless terminal MS3 controlled by the relay station RS3 to the other relay stations RS1 and RS2 during an MS3 data segment of the first period as illustrated in FIG. 1.

When one of the relay station RS1 and the other relay stations RS2 and RS3 receives the multicast data from the corresponding one of the wireless terminals MS1-MS3 controlled by the relay stations RS1-RS3, the scheduler in the relay station RS1 generates the first map such that the one of the relay station RS1 and the other relay stations RS2 and RS3 having received the multicast data transmits the multicast data to the others of the relay station RS1 and the other relay stations RS2 and RS3.

The schedulers in the relay station RS1 and the other relay stations RS2 and RS3 generate the second map such that the relay station RS1 and the other relay stations RS2 and RS3 transmit the multicast data, received during the first period, respectively to the wireless terminals MS1-MS3 during a second period. The scheduler in the relay station RS1 generates the second map in response to the first map generated by the scheduler in the relay station RS1 and the schedulers in the other relay stations RS2 and RS3 generate the second map in response to the first map received from the relay station RS1, such that the relay station RS1 and the other relay stations RS2 and RS3 transmit the multicast data of the wireless terminals MS1-MS3 to the wireless terminals MS1-MS3 at substantially the same timing on the same frequency in the sequential order of the wireless terminals MS1-MS3.

As illustrated in FIG. 1, for example, the schedulers in the relay station RS1 and the other relay stations RS2 and RS3 generate the second map such that the multicast data of the wireless terminal MS1 is transmitted first on the same frequency at substantially the same timing to the controlled wireless terminals MS1-MS3. The schedulers in the relay station RS1 and the other relay stations RS2 and RS3 generate the second map such that the multicast data of the wireless terminal MS2 is transmitted on the same frequency at substantially the same timing to the controlled wireless terminals MS1-MS3 in succession to the transmission of the multicast data of the wireless terminal MS1. The schedulers in the relay station RS1 and the other relay stations RS2 and RS3 generate the second map such that the multicast data of the wireless terminal MS3 is transmitted at on the same frequency the same timing to the controlled wireless terminals MS1-MS3 in succession to the transmission of the multicast data of the wireless terminal MS3.

In response to the second map generated, the relay station RS1 and the other relay stations RS2 and RS3 transmit the multicast data, mutually transmitted, to the wireless terminals MS1-MS3. The controlled wireless terminals MS1-MS3 receive the multicast data in accordance with the second map transmitted from the relay station RS1 and the other relay stations RS2 and RS3, respectively.

The relay station RS1 and the other relay stations RS2 and RS3 exchange with each other the data received from the wireless terminals MS1-MS3 controlled during the first period, and then transmit the data, received during the first period, to the wireless terminals MS1-MS3 controlled during the second period. The other relay stations RS2 and RS3 is free from transmitting to and then receiving from the relay station serving as a base station, the data received from the controlled wireless terminals MS2 and MS3. Wireless resources are thus efficiently used.

A second embodiment is described in detail below with reference to the drawings.

Figure 2:
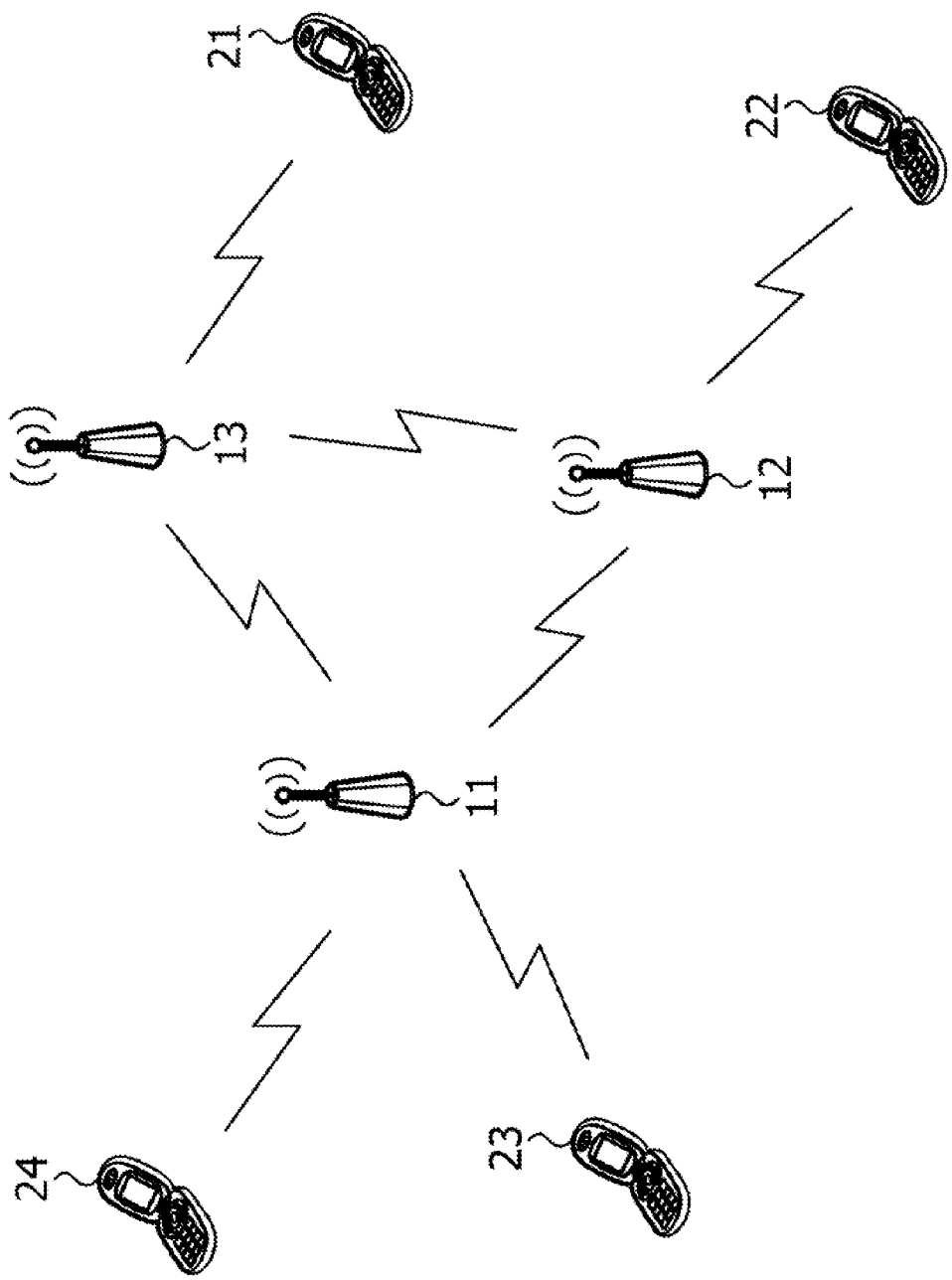
FIG. 2 illustrates a wireless network according to a second embodiment.

FIG. 2 illustrates a wireless network of the second embodiment. FIG. 2 illustrates relay stations 11-13 and wireless terminals 21-24. The relay stations 11-13 and the wireless terminals 21-24 form a wireless ad-hoc network. The relay station 11-13 are installed at locations that allow these relay stations to communicate with each other. The wireless terminal 21 is under the control of the relay station 13, and can communicate with the relay station 13. The wireless terminal 22 is under the control of the relay station 12, and may communicate with the relay station 12. The wireless terminals 23 and 24 are under the control of the relay station 11, and may communicate with the relay station 11. The wireless terminals 21-24 are cellular phones, for example.

In the wireless network of FIG. 2, one of the relay stations 11-13 is selected as a base station that schedules the transmission and reception of the multicast data among the relay stations 11-13. The relay station serving as the base station may be pre-selected by a user or by the relay stations 11-13 that communicate each other. The following discussion is based on the premise that the relay station 11 is selected as a relay station serving as a base station.

Figure 3:
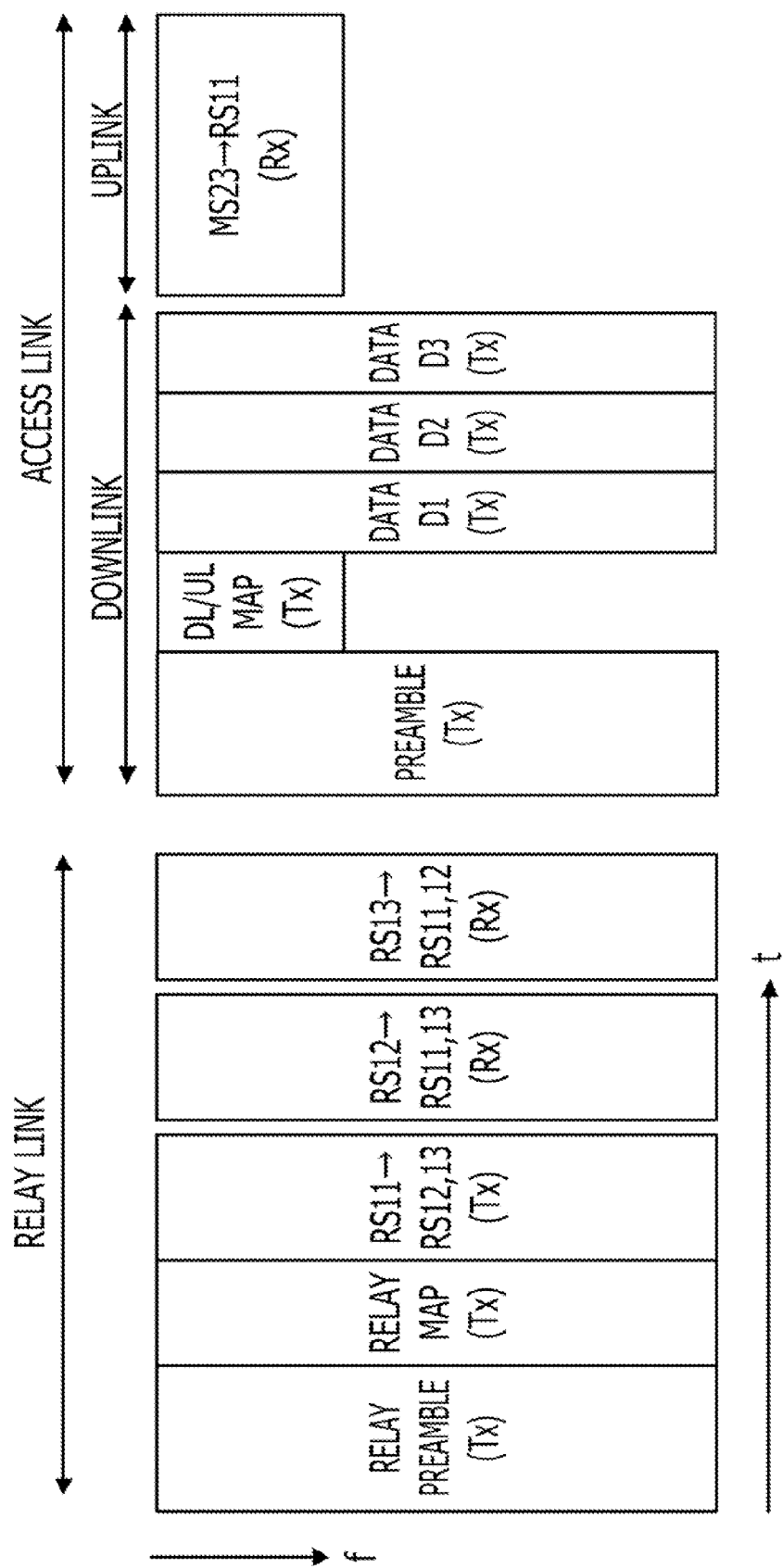
FIG. 3 illustrates a frame structure of a relay station serving as a base station.

FIG. 3 illustrates an OFDMA frame structure of a relay station serving as a base station. As illustrated in FIG. 3, a frame of the relay station 11 serving as the base station includes a relay link and an access link. In FIG. 3, the horizontal axis represents time while the vertical axis represents frequency.

Through the relay link, the relay station 11 performs wireless communications with the relay stations 12 and 13. Through a downlink of the access link, the relay station 11 transmits data or broadcasts the multicast data to the wireless terminals 23 and 24. Through the uplink of the access link, the relay station 11 receives data transmitted from the wireless terminals 23 and 24.

A relay preamble of the relay link indicates a segment through which a signal for establishing synchronization among the relay stations 11-13 is transmitted. The label Tx of the relay preamble indicates that the relay station 11 transmits the relay preamble during this segment. The other relay stations 12 and 13 receive the relay preamble from the relay station 11 to establish synchronization with the relay station 11.

A relay map in succession to the relay preamble indicates a segment through which scheduling information (relay map) generated by the relay station 11 is transmitted. The relay map includes configuration information and control information of segments in succession to the relay map. The label Tx of the relay map indicates that the relay station 11 transmits the relay map to the relay stations 12 and 13 during this segment. The relay map is transmitted to the relay stations 12 and 13 using all frequencies.

During a segment in succession to the relay map, the multicast data is exchanged among the relay stations 11-13 in accordance with the relay map. The label Tx of the segment in succession to the relay map represents the relay station 11 transmits the multicast data to the relay stations 12 and 13 during this segment. The label Rx indicates that the relay station 11 receives the multicast data from the relay stations 12 and 13 through this segment. The multicast data is exchanged among the relay stations 11-13 using all frequencies.

Referring to FIG. 3, the segments in succession to the relay map include three segments. During a first segment, the multicast data received by the relay station 11 is broadcasted to the relay stations 12 and 13. During a second segment, the multicast data received by the relay station 12 is broadcasted to the relay stations 11 and 13. During a last segment, the multicast data received by the relay station 13 is broadcasted to the relay stations 11 and 12. In FIG. 3, RS represents a relay station, and MS represents a wireless terminal. In the discussion that follows, a relay station is also simply referred to as RS, and a wireless terminal is also simply referred to as MS.

FIG. 3 illustrates the frame structure in which the relay stations 11-13 receive substantially concurrently the multicast data from the wireless terminals 21-24 controlled thereby. More specifically, in the frame structure, the relay station 11 serving as a base station receives the multicast data from the wireless terminals 23 and 24 controlled by the relay station 11 and receives from the relay stations 12 and 13 a bandwidth request (made by the relay stations 12 and 13 that the multicast data be mutually transmitted to the relay stations 11-13 because the relay stations 12 and 13 have received the multicast data from the wireless terminals 21 and 22 controlled thereby).

If the bandwidth request has been made by only the relay station 12, the relay station 11 generates the relay map such that the multicast data is transmitted from the relay station 12 to the relay stations 11 and 13. The segment in succession to the relay map includes only the segment throughout which the multicast data is broadcasted from the relay station 12 to the relay stations 11 and 13. For example, the segment in succession to the relay map includes only the segment 'RS12→RS11,13' of FIG. 3.

An access preamble of the access link indicates a segment during which a signal for the wireless terminals 23 and 24 to establish synchronization with the relay station 11 is transmitted. The label Tx of the preamble indicates that the relay station 11 transmits the preamble during the corresponding segment. The wireless terminals 23 and 24 controlled by the relay station 11 establish synchronization with the relay station 11 by receiving the preamble.

A downlink (DL)/uplink (UL) map in succession to the preamble indicates a segment through which scheduling information for data to be exchanged among the relay station 11 and the wireless terminals 23 and 24 is transmitted. The DL/UL map includes configuration information and control information of a segment in succession to the DL/UL map. The label Tx of the DL/UL map indicates that the relay station 11 transmits the DL/UL map to the wireless terminals 23 and 24 controlled by the relay station 11 during this segment.

As will be described later, the relay station 11 generates the DL/UL map that is used to broadcast the multicast data to the wireless terminals 23 and 24 controlled by the relay station 11 in accordance with the relay map generated through the relay link.

During downlink segments in succession to the DL/UL map, data is transmitted to the wireless terminals 23 and 24 controlled by the relay station 11. The label Tx of the downlink segment in succession to the DL/UL map indicates that the relay station 11 transmits data to the wireless terminals 23 and 24 during the segment.

Referring to FIG. 3, during the segments in succession to the DL/UL map, the multicast data exchanged among the relay stations 11-13 through the relay link is broadcasted to the wireless terminals 23 and 24 controlled by the relay station 11. For example, during the segment of data D1 of FIG. 3, the relay station 11 broadcasts the multicast data received from the wireless terminals 23 and 24 controlled by the relay station 11 to the wireless terminals 23 and 24. During the segment of data D2, the relay station 11 broadcasts to the wireless terminals 23 and 24 the multicast data that the relay station 12 has received from the wireless terminal 22 controlled by the relay station 12. During the segment of data D3, the relay station 11 broadcasts to the wireless terminals 23 and 24 the multicast data that the relay station 13 has received from the wireless terminal 21 controlled by the relay station 13. The multicast data is broadcasted using all frequencies.

The uplink indicates a segment during which the relay station 11 receives data from the wireless terminals 23 and 24 controlled by the relay station 11 in accordance with the DL/UL map. The label Rx of the uplink indicates that the relay station 11 receives the data from the wireless terminals 23 and 24 during this segment. Referring to FIG. 3, the relay station 11 receives data from the wireless terminal 23 using part of the frequency bandwidth.

Figure 4:
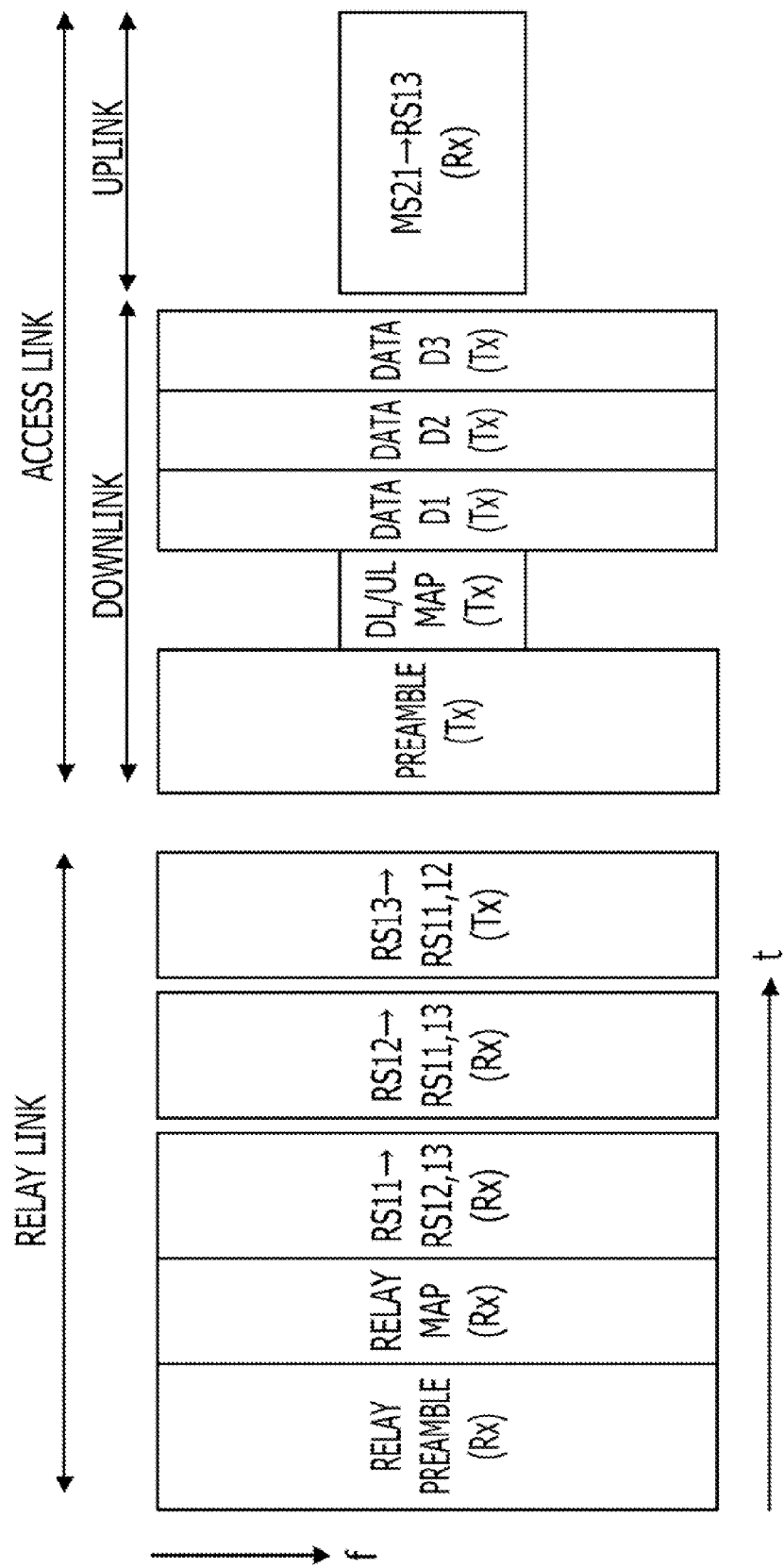
FIG. 4 illustrates a frame structure of a relay station other than the relay station serving as a base station.

FIG. 4 illustrates a frame structure of a relay station other than the relay station serving as a base station. Referring to FIG. 4, the frame structure of the relay station 13 not serving as a base station is illustrated. The frame structure of the relay station 13 includes a relay link and an access link. In FIG. 4, the horizontal axis represents time, and the vertical axis represents frequency.

The frame structure illustrated in FIG. 4 is taken at substantially the same timing as the frame structure illustrated in FIG. 3. During the relay preamble segment and the relay map segment illustrated in FIG. 3, the relay station 13 receives the relay preamble and the relay map from the relay station 11, and broadcasts the multicast data to the other relay stations 11 and 12 and receives the multicast data from the other relay stations 11 and 12 in accordance with the received relay map.

The relay station 13 performs wireless communications with the relay stations 11 and 12 through the relay link. The relay station 13 transmits data to the wireless terminal 21 or broadcasts the multicast data through the downlink of the access link. The relay station 13 receives data from the wireless terminal 21 through the uplink of the access link.

The relay preamble of the relay link indicates a segment during which a signal for establishing synchronization among the relay stations 11-13 is transmitted. The label Rx of the relay preamble indicates that the relay station 13 receives the relay preamble from the relay station 11 during this segment. The relay station 13 establishes synchronization with the relay station 11 by receiving the relay preamble.

The relay map in succession to the relay preamble indicates segments through which the relay map generated by the relay station 11 serving as a base station is received. The relay map includes configuration information and control information of the segments in succession to the relay map. The label Rx of the relay map indicates that the relay station 13 receives the relay map from the relay station 11.

During the segments in succession to the relay map, the multicast data is exchanged among the relay stations 11-13 in accordance with the relay map. The label Tx of the segment in succession to the relay map represents that the relay station 13 transmits the multicast data to the other relay stations 11 and 12 during this segment. The label Rx of the segment indicates that the relay station 13 receives the multicast data from the other relay stations 11 and 12 during this segment.

As illustrated in FIG. 4, the segments in succession to the relay map include three segments. During a first segment, the relay stations 12 and 13 receive the multicast data broadcast by the relay station 11. During a next segment, the relay stations 11 and 13 receive the multicast data broadcast by the relay station 12. During a last segment, the other relay stations 11 and 12 receive the multicast data broadcast by the relay station 13.

The preamble of the access link indicates a segment during which a signal for the wireless terminal 21 controlled by the relay station 13 to establish synchronization with the relay station 13 is transmitted. The label Tx of the preamble indicates that the relay station 13 transmits the preamble during this segment. The wireless terminal 21 controlled by the relay station 13 receives the preamble and establishes synchronization with the relay station 13.

A DL/UL map in succession to the preamble indicates a segment during which scheduling information for exchanging data between the relay station 13 and the wireless terminal 21 is transmitted. The DL/UL map includes configuration information and control information of segments in succession to the relay map. The label Tx of the DL/UL map indicates that the relay station 13 transmits the DL/UL map to the wireless terminal 21 controlled by the relay station 13 during this segment.

As described in detail later, the relay station 13 generates the DL/UL map to be used to broadcast the multicast data to the wireless terminal 21 controlled by the relay station 13, based on the relay map received from the relay station 11 serving as the base station. As illustrated in FIG. 4, the DL/UL map is transmitted to the wireless terminal 21 on a frequency different from the frequency of the DL/UL map of FIG. 3.

During downlink segments in succession to the DL/UL map, data is transmitted to the wireless terminal 21 controlled by the relay station 13 in accordance with the DL/UL map. The label Tx of the downlink segments in succession to the DL/UL map represents that the relay station 13 transmits data to the wireless terminal 21.

As illustrated in FIG. 4, the multicast data exchanged among the relay stations 11-13 through the relay link is broadcasted to the wireless terminal 21, controlled by the relay station 13, during the segments in succession to the DL/UL map. For example, during the segment of data D1 of FIG. 4, the multicast data that the relay station 11 has received from the wireless terminals 23 and 24 controlled by the relay station 11 is broadcasted via the relay station 13 to the wireless terminal 21 controlled by the relay station 13. During the segment of data D2, the multicast data that the relay station 12 has received from the wireless terminal 22 controlled by the relay station 12 is broadcasted via the relay station 13 to the wireless terminal 21 controlled by the relay station 13. During the segment of data D3, the multicast data that the relay station 13 has received from the wireless terminal 21 controlled by the relay station 13 is broadcasted via the relay station 13 to the wireless terminal 21 controlled by the relay station 13. The multicast data is broadcasted using all frequencies, for example.

An uplink indicates a segment during which the relay station 13 receives data from the wireless terminal 21 controlled thereby in accordance with the DL/UL map. The label Rx of the uplink indicates that the relay station 13 receives data from the wireless terminal 21 controlled by the relay station 13. Referring to FIG. 4, the data is received from the wireless terminal 21 using a frequency different from a frequency of the uplink of FIG. 3.

Figure 5:
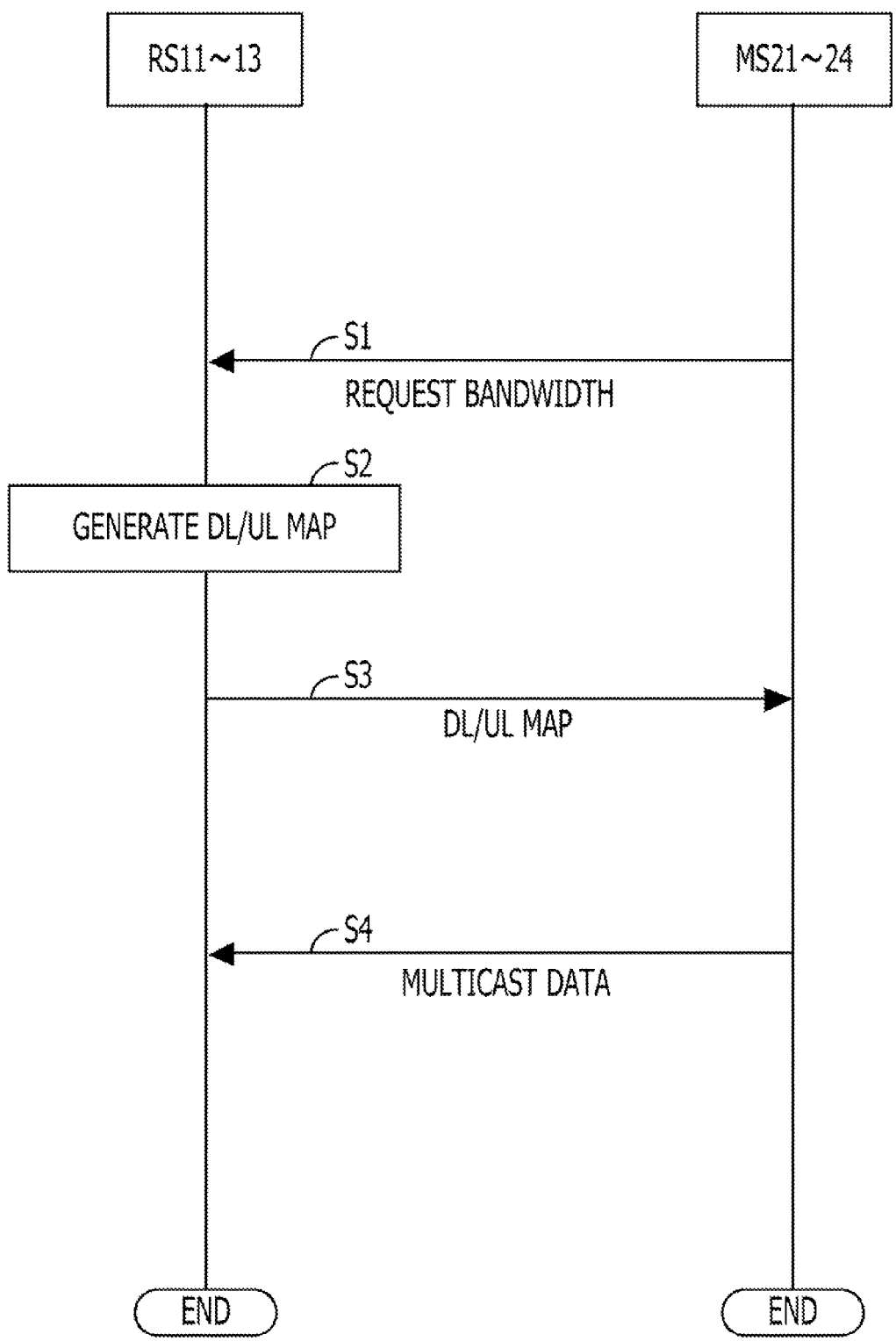
FIG. 5 is a sequence chart in accordance with which the relay station receives multicast data from a wireless terminal.

FIG. 5 illustrates a sequence chart in accordance with which the relay station receives the multicast data from the wireless terminal.

Step S1: For multicast communications, the wireless terminals 21-24 issue bandwidth requests to the relay stations 11-13 that respectively control the wireless terminals 21-24. For example, the MS21 is controlled by the relay station 13 and thus issues a bandwidth request to the relay station 13. The bandwidth request is performed through the uplink of the access link.

Step S2: The relay stations 11-13 receive the bandwidth requests from the wireless terminals 21-24. The relay stations 11-13 then generate the DL/UL maps such that the wireless terminals 21-24 transmit the multicast data to the relay stations 11-13 through the uplink of the access link.

Step S3: The relay stations 11-13 transmit the generated DL/UL maps to the wireless terminals 21-24 controlled by the relay stations 11-13 through the downlink of the access link.

Step S4: The wireless terminals 21-24 transmit the multicast data respectively to the relay stations 11-13 through the uplink of the access link in accordance with the received DL/UL maps.

The multicast data of the wireless terminals 21-24 to be broadcasted are thus received by and then stored on the relay stations 11-13, respectively.

Figure 6:
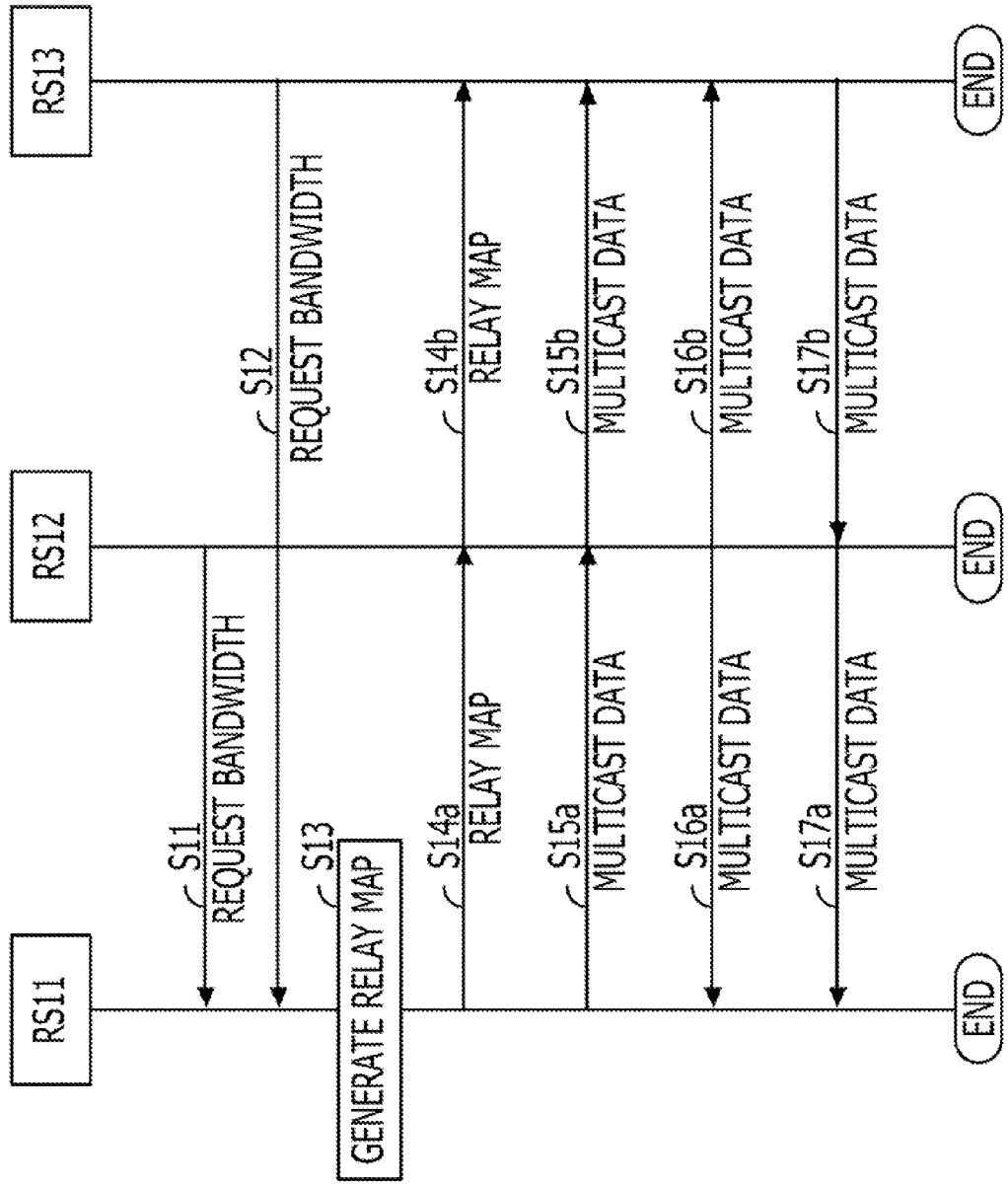
FIG. 6 is a sequence chart in accordance with which the multicast data is broadcasted among relay stations.

FIG. 6 is a sequence chart illustrates that the multicast data is broadcasted among the relay stations.

Step S11: Upon receiving the multicast data from the wireless terminal 22 controlled by the relay station 12, the relay station 12 issues a bandwidth request to the relay station 11 serving as the base station. The relay station 12 issues the bandwidth request in the segment in succession to the relay map of the relay link.

Step S12: Upon receiving the multicast data from the wireless terminal 21 controlled by the relay station 13, the relay station 13 issues a bandwidth request to the relay station 11 serving as the base station.

Even if the relay station 11 receives the multicast data from the wireless terminals 23 and 24 controlled by the relay station, the relay station 11 issues no bandwidth request to any other relay stations because the relay station 11 serves as the base station. More specifically, upon receiving the multicast data from the wireless terminals 23 and 24 controlled by the relay station 11, the relay station 11 generates the relay map in the next step.

Step S13: The relay station 11 generates the relay map in response to the bandwidth request from the relay stations 12 and 13. The relay station 11 in FIG. 6 is also assumed to receive the bandwidth request and the multicast data from the wireless terminals 23 and 24 controlled thereby.

The relay station 11 generates the relay map such that the multicast data that each of the relay stations 11-13 have received through the relay link respectively from the wireless terminals 21-24 is broadcasted to another of the relay stations 11-13.

As illustrated in FIG. 3, the relay station 11 generates the relay map such that the multicast data that the relay station 11 has received from the wireless terminals 23 and 24 is broadcasted to the relay stations 12 and 13 in the first segment in succession to the relay map. The relay station 11 also generates the relay map such that the multicast data that the relay station 12 has received from the wireless terminal 22 is broadcasted to the relay stations 11 and 13. The relay station 11 also generates the relay map such that the multicast data that the relay station 13 has received from the wireless terminal 21 is broadcasted to the relay stations 11 and 12.

In the sequence chart of FIG. 6, the relay station 11 receives the bandwidth requests from the relay stations 12 and 13 and is assumed to receive the multicast data from the wireless terminals 23 and 24 controlled by the relay station 11. If the relay station 11 receives the bandwidth request from only the relay station 12, the relay station 11 generates the relay map such that only the relay station 12 broadcasts the multicast data through the relay link.

Steps S14a and S14b: The relay station 11 broadcasts the generated relay map to the relay stations 12 and 13 through the relay link. For example, the relay station 11 transmits the generated relay map during the relay map segment of the relay link of FIG. 3.

Steps S15a and S15b: The relay station 11 broadcasts the multicast data, received from the wireless terminals 23 and 24 and stored on the relay station 11, to the relay stations 12 and 13 in accordance with the relay map generated by the relay station 11. The relay stations 12 and 13 receive the multicast data, broadcasted by the relay station 11, in accordance with the relay map received from the relay station 11.

Steps S16a and S16b: The relay station 12 broadcasts the multicast data, received from the wireless terminal 22 and stored on the relay station 12, to the relay stations 11 and 13 in accordance with the relay map received from the relay station 11. The relay station 11 and the relay station 13 receive the multicast data broadcasted.

Steps S17a and S17b: The relay station 13 broadcasts the multicast data, received from the wireless terminal 21 and stored on the relay station 13, to the relay stations 11 and 12 in accordance with the relay map received from the relay station 11. The relay station 11 and the relay station 12 receive the multicast data broadcasted by the relay station 13 in accordance with the relay map generated by the relay station 11.

One of the relay stations 11-13 may thus share (store) each other's multicast data through mutual communications among the relay stations 11-13.

Figure 7:
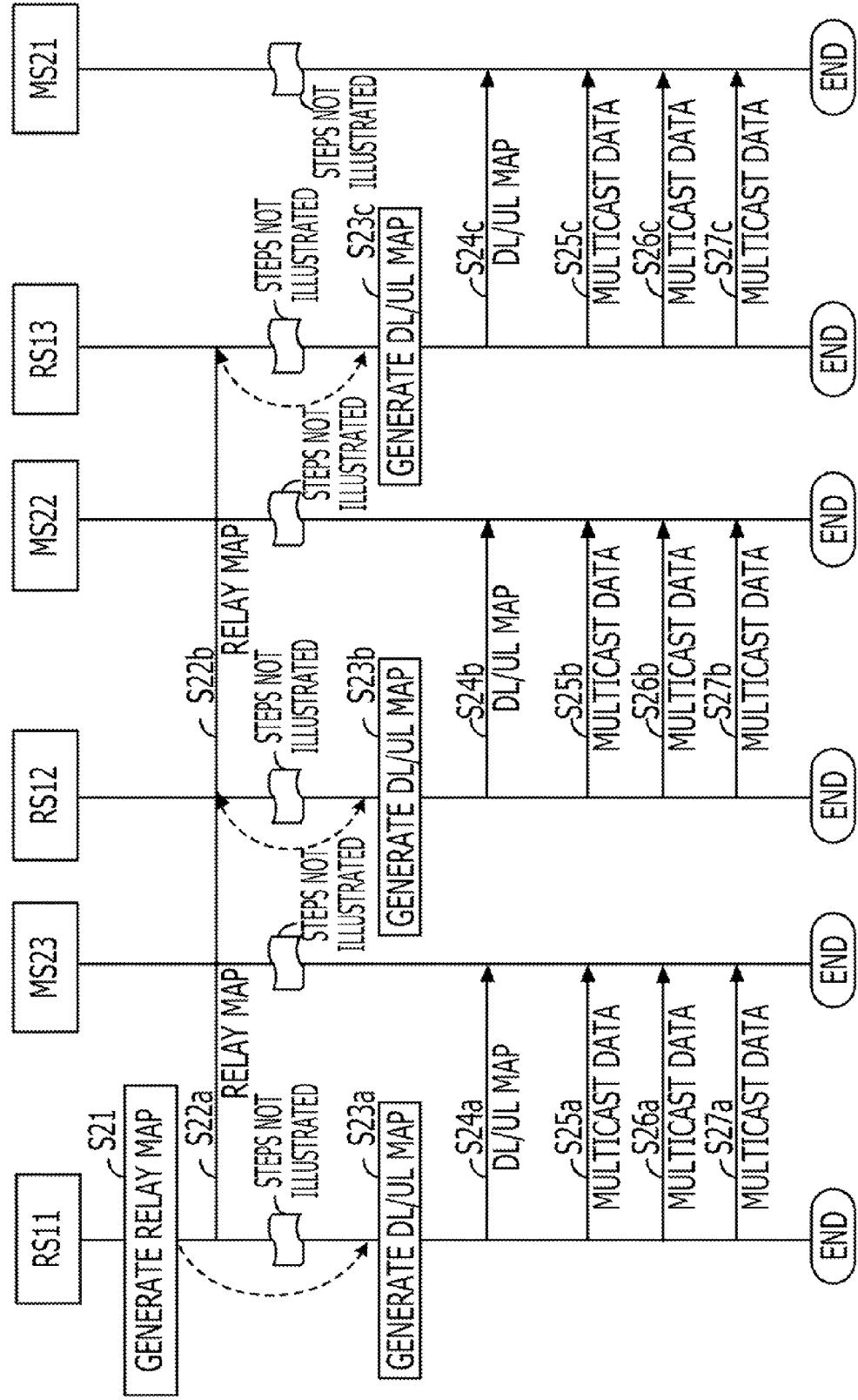
FIG. 7 is a sequence chart in accordance with which the relay station broadcasts the multicast data to wireless terminals.

FIG. 7 is a sequence chart illustrates that the multicast data is broadcasted from the relay station to the wireless terminals. As illustrated in FIG. 7, the operation of the wireless terminal 24 is omitted.

Step S21: Upon receiving the bandwidth request from the relay stations 12 and 13, the relay station 11 generates the relay map. Step S21 corresponds to step S13 of FIG. 6.

Steps S22a and S22b: The relay station 11 broadcasts the generated relay map to the other relay stations 12 and 13 through the relay link. Steps S22a and S22b respectively correspond to steps S14a and S14b.

Steps S23a-S23c: In step S23a, the relay station 11 generates a DL/UL map in accordance with the relay map generated by the relay station 11. In step S23b, the relay station 12 generates a DL/UL map in accordance with the relay map received from the relay station 11. In step S23c, the relay station 13 generates a DL/UL map in accordance with the relay map received from the relay station 11. Process steps corresponding to steps S15a, S15b, S16a, S16b, S17a, and S17b of FIG. 6 are not illustrated between steps S22a and S22b and steps S23a-S23c of FIG. 7.

The relay stations 11-13 generate the DL/UL maps in response to the relay maps such that each of the relay stations 11-13 broadcasts the multicast data, received from another of the relay stations 11-13, on the same frequency and at substantially the same timing (in synchronization with the relay stations 11-13). For example, the relay stations 11-13 generate the DL/UL maps such that the multicast data that the relay station 11 has received from the wireless terminals 23 and 24 is broadcasted on the same frequency and at substantially the same timing. The relay stations 11-13 generate the DL/UL maps such that the multicast data that the relay station 12 has received from the wireless terminal 22 is broadcasted on the same frequency and at the same timing. The relay stations 11-13 generate the DL/UL maps such that the multicast data that the relay station 13 has received from the wireless terminal 21 is broadcasted on the same frequency and at substantially the same timing. The relay stations 11-13 share the same relay map. In accordance with the relay map, the relay stations 11-13 generate the DL/UL maps such that the multicast data of the relay stations 11-13 is broadcasted on the same frequency and at substantially the same timing in a specific order.

Steps S24a-S24c: The relay stations 11-13 transmit the generated DL/UL maps to the wireless terminals 21-24 respectively controlled by the relay stations 11-13 on different frequencies and at substantially the same timing. The wireless terminals 21-24 receive the DL/UL maps broadcasted by the relay stations 11-13, respectively.

Steps S25a-S25c: In accordance with the DL/UL maps, the relay stations 11-13 broadcast the multicast data received by the relay station 11 to the wireless terminals 21-24 respectively controlled by the relay stations 11-13. The relay stations 11-13 broadcast the multicast data, received by the relay station 11, on the same frequency and at substantially the same timing. In accordance with the DL/UL maps received in steps S24a-S24c, the wireless terminals 21-24 receive the multicast data broadcasted by the relay stations 11-13, respectively.

Steps S26a-S26c: In accordance with the DL/UL maps, the relay stations 11-13 broadcast the multicast data received by the relay station 12 to the wireless terminals 21-24 respectively controlled by the relay stations 11-13. The relay stations 11-13 broadcast the multicast data received by the relay station 12 on the same frequency and at substantially the same timing. In accordance with the DL/UL maps received in steps S24a-S24c, the wireless terminals 21-24 receive the multicast data broadcasted by the relay stations 11-13, respectively.

Steps S27a-S27c: In accordance with the DL/UL maps, the relay stations 11-13 broadcast the multicast data received by the relay station 13 to the wireless terminals 21-24 respectively controlled by the relay stations 11-13. The relay stations 11-13 broadcast the multicast data received by the relay station 13 on the same frequency and at the same timing. In accordance with the DL/UL maps received in steps S24a-S24c, the wireless terminals 21-24 receive the multicast data broadcasted by the relay stations 11-13, respectively.

The wireless terminals 21-24 receive the multicast data on the same frequency and at the same timing in this way.

Figure 8:
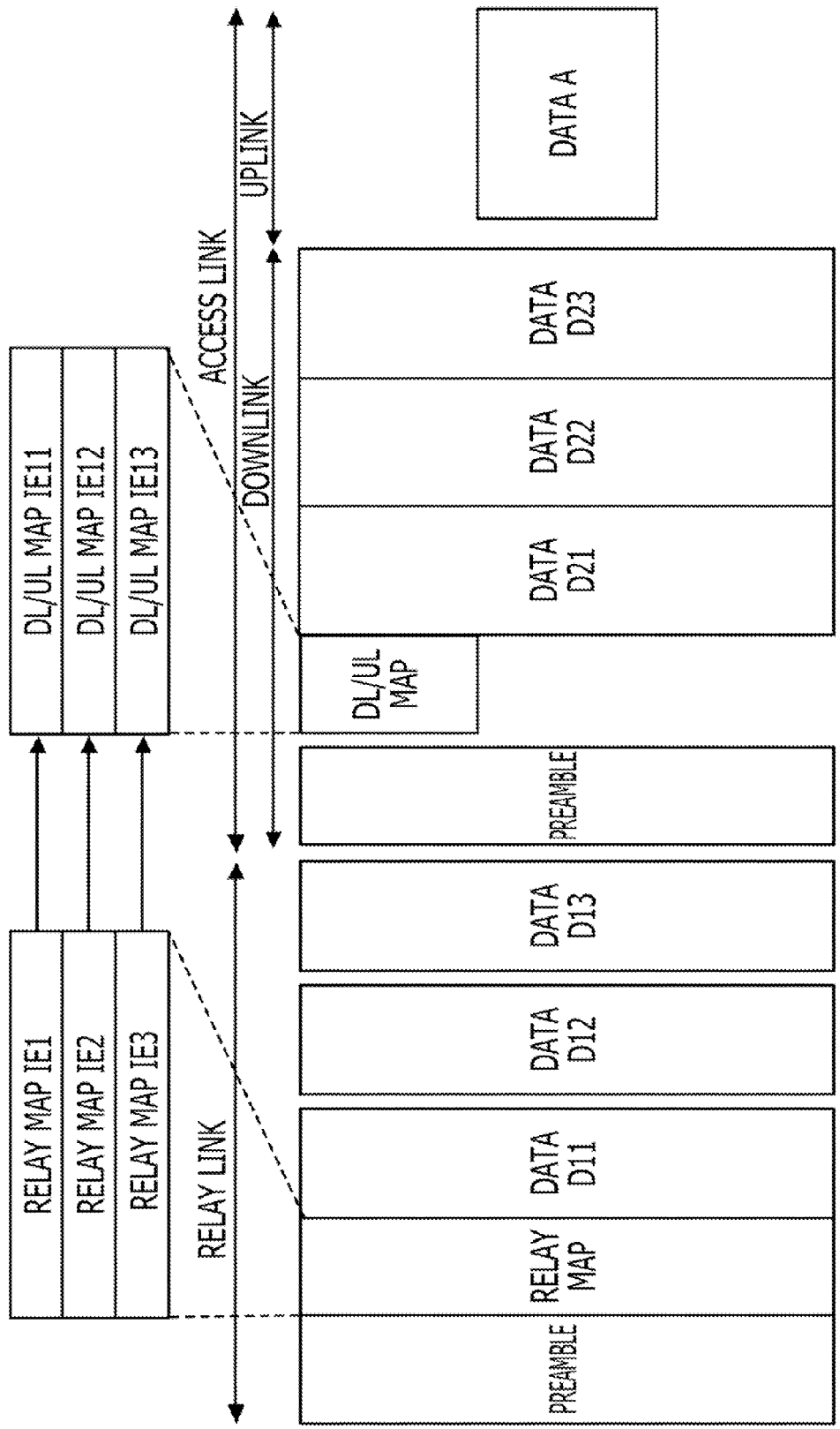
FIG. 8 illustrates how a DL/UL map is generated.

FIG. 8 illustrates how the DL/UL map is generated. Relay map IEs 1-3 illustrated in FIG. 8 include position information and transmission control information of data D11-D13 and identifiers (IDs) of the relay stations 11-13, which are used by the relay stations 11-13 to exchange the multicast data.

The relay map IE1 includes the position information and transmission control information of the data D11, and the ID of the relay station 11 that broadcasts the multicast data in a segment of the data D11. The relay map IE2 includes the position information and transmission control information of the data D12, and the ID of the relay station 12 that broadcasts the multicast data in a segment of the data D12. The relay map IE3 includes the position information and transmission control information of the data D13, and the ID of the relay station 13 that broadcasts the multicast data in a segment of the data D13.

DL/UL map IEs 11-13 include position information and transmission control information of data D21-D23 in accordance with which the relay stations 11-13 broadcast the multicast data to the wireless terminals 21-24 and the wireless terminals 21-24 receive the multicast data. The DL/UL maps IE11-IE13 also includes the IDs of the wireless terminals 21-24.

The DL/UL map IEs 11-13 are generated based on the relay maps IE1-IE3. For example, the relay stations 11-13 copy the position information and the transmission control information of the relay map IE1, as is, onto the DL/UL map IE11 such that the multicast data, broadcast in the segment of data D11, is broadcasted in the segment of data D21. The relay stations 11-13 copy the position information and the transmission control information of the relay map IE2, as is, onto the DL/UL map IE12 such that the multicast data, broadcast in the segment of data D12, is broadcasted in the segment of data D22. The relay stations 11-13 copy the position information and the transmission control information of the relay map IE3, as is, onto the DL/UL map IE13 such that the multicast data, broadcast in the segment of data D13, is broadcasted in the segment of data D23.

The order and size of the data D21-D23 through the access link are substantially identical to those of the data D11-D13 through the relay link. The multicast data broadcasted from one of the relay stations 11-13 to another of the relay stations 11-13 in the segment of data D11 is broadcasted to the wireless terminals 21-24 in synchronization with the other of the relay stations 11-13 in the data D21 of the access link. The multicast data broadcast from one of the relay stations 11-13 to another of the relay stations 11-13 in the segment of data D12 is broadcast to the wireless terminals 21-24 in synchronization with the other of the relay stations 11-13 in the data D22 of the access link. The multicast data broadcast from one of the relay stations 11-13 to another of the relay stations 11-13 in the segment of data D13 is broadcast to the wireless terminals 21-24 in synchronization with the other of the relay stations 11-13 in the data D23 of the access link.

Figure 9:
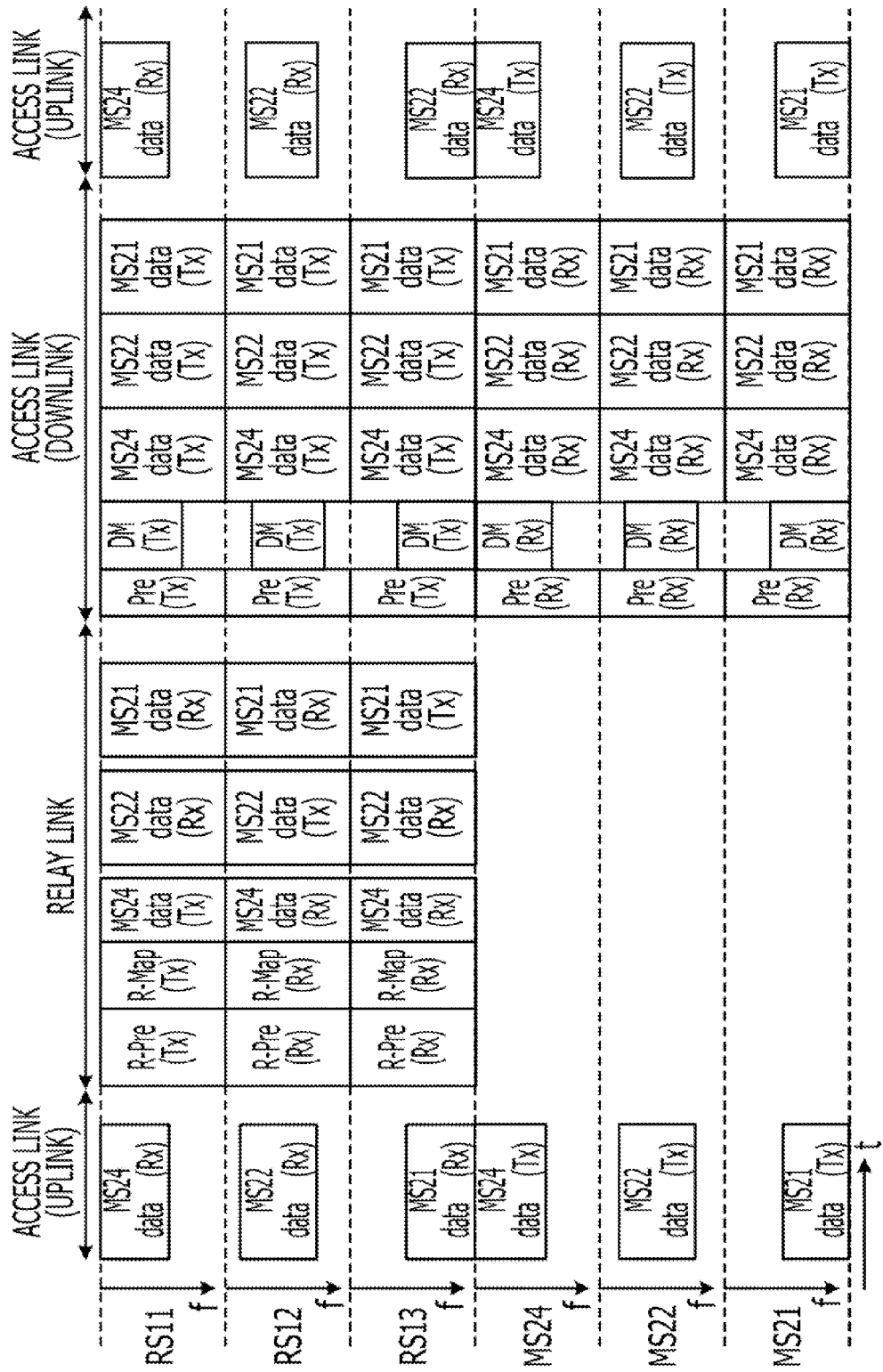
FIG. 9 illustrates a flow of frames among the relay station and the wireless terminals.

FIG. 9 illustrates a general frame flow in the relay stations and the wireless terminals. Referring to FIG. 9, the frame flow of the relay stations 11-13 and the wireless terminals 21, 22, and 24 is illustrated. In FIG. 9, the vertical line represents frequency of each of the relay stations 11-13 and the wireless terminals 21, 22, and 24 and the horizontal line represents time. A process step for the bandwidth request for each of the relay stations 11-13 and the wireless terminals 21, 22, and 24 is omitted. Labels Tx and Rx respectively represent transmission and reception of a frame.

Referring to FIG. 9, the wireless terminals 21, 22, and 24 respectively transmit the multicast data to the relay stations 11-13 on different frequencies and at substantially the same timing through the uplink of the access link.

The relay stations 11-13 establish relay synchronization by using the relay preamble (labeled R-Pre in FIG. 9) transmitted from the relay station 11. The relay station 11 generates a relay map (labeled R-Map in FIG. 9) and transmits the relay map to the relay stations 12 and 13.

The relay station 11 broadcasts the multicast data received from the wireless terminal 24 to the relay stations 12 and 13 in accordance with the relay map generated by the relay station 11. The relay station 12 broadcasts the multicast data received from the wireless terminal 22 to the relay stations 11 and 13 in accordance with the relay map received from the relay station 11. The relay station 13 broadcasts the multicast data received from the wireless terminal 21 to the other relay stations 11 and 12 in accordance with the relay map received from the relay station 11.

The relay stations 11-13 transmit the preamble (labeled Pre in FIG. 9) to establish access link synchronization. The relay stations 11-13 generate the DL/UL maps (labeled DM in FIG. 9) in accordance with the relay map generated by the relay station 11. The relay stations 11-13 broadcast the DL/UL maps respectively to the wireless terminals 21, 22, and 24 on different frequencies and at the same timing.

In accordance with the generated DL/UL maps, the relay stations 11-13 broadcast the multicast data of the wireless terminals 21, 22, and 24. As illustrated in FIG. 9, the relay stations 11-13 broadcast the multicast data of the wireless terminal 24 on the same frequency and at substantially the same timing during a first segment in succession to the DL/UL map. The relay stations 11-13 broadcast the multicast data of the wireless terminal 22 on the same frequency and at substantially the same timing during a next segment. The relay stations 11-13 broadcast the multicast data of the wireless terminal 21 on the same frequency and at substantially the same timing during a next segment. The wireless terminals 21, 22, and 24 receive the multicast data broadcast by the relay stations 11-13 in accordance with the DL/UL maps received from the relay stations 11-13, respectively.

As illustrated in the relay link in FIG. 9, the relay maps are generated such that the multicast data is transmitted in the order of the wireless terminals 24, 22, and 21. In accordance with the relay maps, the relay stations 11-13 generate the DL/UL maps such that the multicast data is broadcasted through the access link in the order of the wireless terminals 24, 22, and 21.

Figure 10:
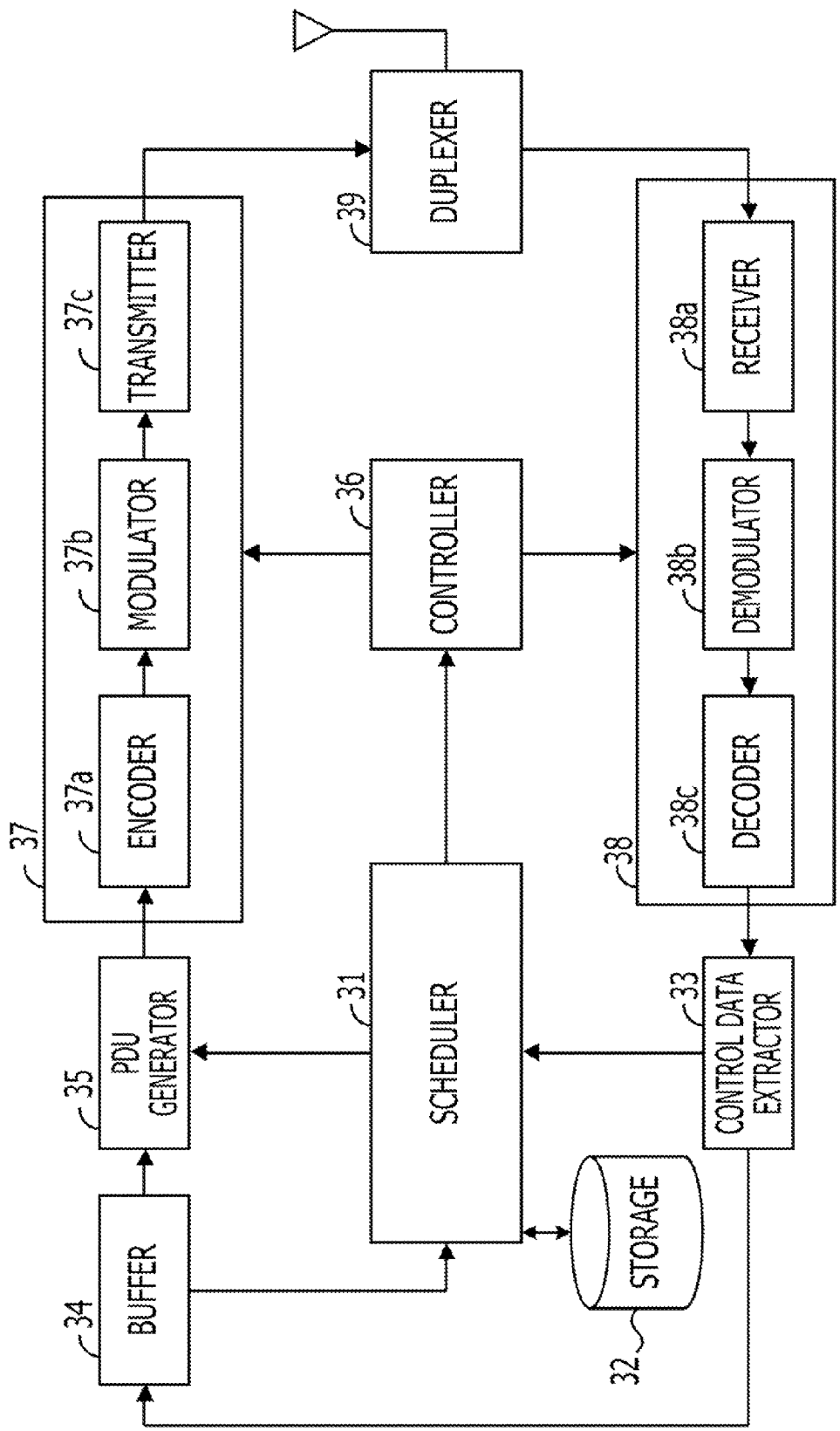
FIG. 10 is a block diagram illustrating a relay station of the second embodiment.

FIG. 10 is a block diagram of the relay station 11 of the second embodiment. As illustrated in FIG. 10, the relay station 11 includes scheduler 31, storage 32, control data extractor 33, buffer 34, PDU (protocol data unit) generator 35, controller 36, transmission processor 37, reception processor 38, and duplexer 39. The relay stations 12 and 13 are substantially identical in block diagram to the relay station 11.

The scheduler 31 generates a relay map in response to a bandwidth request from the other relay stations 12 and 13 extracted by the control data extractor 33. The scheduler 31 generates the relay map when the multicast data transmitted from the controlled wireless terminals 23 and 24 is stored on the buffer 34. The scheduler 31 stores the relay map on the storage 32 to generate a DL/UL map.

The scheduler 31 generates the DL/UL map of the data exchange between the relay station 11 and the wireless terminals 23 and 24 controlled by the relay station 11. The scheduler 31 generates here a UL map of the DL/UL map in response to bandwidth requests of the multicast data from the wireless terminals 23 and 24. The scheduler 31 then generates a DL map of the DL/UL map in accordance with the relay map stored on the storage 32.

The control data extractor 33 extracts, from reception data, control data such as the bandwidth requests transmitted from the relay stations 12 and 13, and outputs the extracted control data to the scheduler 31. The control data extractor 33 also extracts, from the reception data, data such as the multicast data transmitted from the wireless terminals 23 and 24 controlled by the relay station 11 and outputs the extracted data to the buffer 34.

The buffer 34 temporarily stores the multicast data received from the wireless terminal 23 and the wireless terminal 24 controlled by the relay station 11, and the other relay stations 12 and 13.

The PDU generator 35 reads the multicast data from the buffer 34 in accordance with the relay map and the DL/UL map generated by the scheduler 31, and generates a PDU.

The controller 36 controls the transmission processor 37 and the reception processor 38. Through the relay link, the controller 36 controls the transmission processor 37 and the reception processor 38 in accordance with the relay map generated by the scheduler 31 such that the relay station 11 communicates with the relay stations 12 and 13. Through the access link, the controller 36 controls the transmission processor 37 and the reception processor 38 such that the relay station 11 communicates with the wireless terminals 23 and 24 in accordance with the DL/UL map.

The transmission processor 37 includes encoder 37a, modulator 37b, and transmitter 37c. The encoder 37a encodes transmission data (PDU data). The modulator 37b modulates the encoded transmission data. The transmitter 37c performs a frequency conversion operation, an amplification operation, etc. on the modulated transmission data.

The reception processor 38 includes receiver 38a, demodulator 38b, and decoder 38c. The receiver 38a performs a frequency conversion operation, an amplification operation, etc. on reception data. The demodulator 38b demodulates the reception data. The decoder 38c decodes the demodulated reception data.

The duplexer 39 outputs the transmission data output from the transmission processor 37 to an antenna, and outputs the reception data received by the antenna to the reception processor 38.

The scheduler in each of the relay stations 12 and 13 generates a DL map in accordance with the relay map transmitted by the relay station 11 serving as a base station.

In each of the relay stations 12 and 13, the control data extractor extracts from the reception data the multicast data transmitted by the wireless terminals 21 and 22 respectively controlled by the relay stations 13 and 12, and then output the extracted reception data to the buffer. In each of the relay stations 12 and 13, the scheduler issues a bandwidth request to the relay station 11 serving as a base station when the multicast data is stored on the buffer. In accordance with the relay map transmitted from the relay station 11, the buffer broadcasts the multicast data of the wireless terminals 21 and 22 stored on the buffer 34 to another of the relay stations 11-13.

In this way, the relay stations 11-13 exchange the multicast data received from the wireless terminals 21-24 controlled thereby through the relay link, and broadcast the mutually exchanged multicast data to the wireless terminals 21-24 controlled thereby through the access link. The relay stations 11-13 is thus free from transmitting to the relay station 11 serving as the base station the multicast data received from the wireless terminals 21-24 controlled respectively by the relay stations 11-13 and receiving substantially the same multicast data from the relay station 11 serving as the base station. Each of the relay stations 11-13 simply transmits the multicast data received from the wireless terminals 21-24 controlled thereby to another of the relay stations 11-13. Wireless resources are thus effectively used.

A third embodiment is described in detail below with reference to the drawings. In the second embodiment, the same frequency is used in the relay link and the access link. In accordance with the third embodiment, different (center) frequencies are used in the relay link and the access link.

Figure 11:
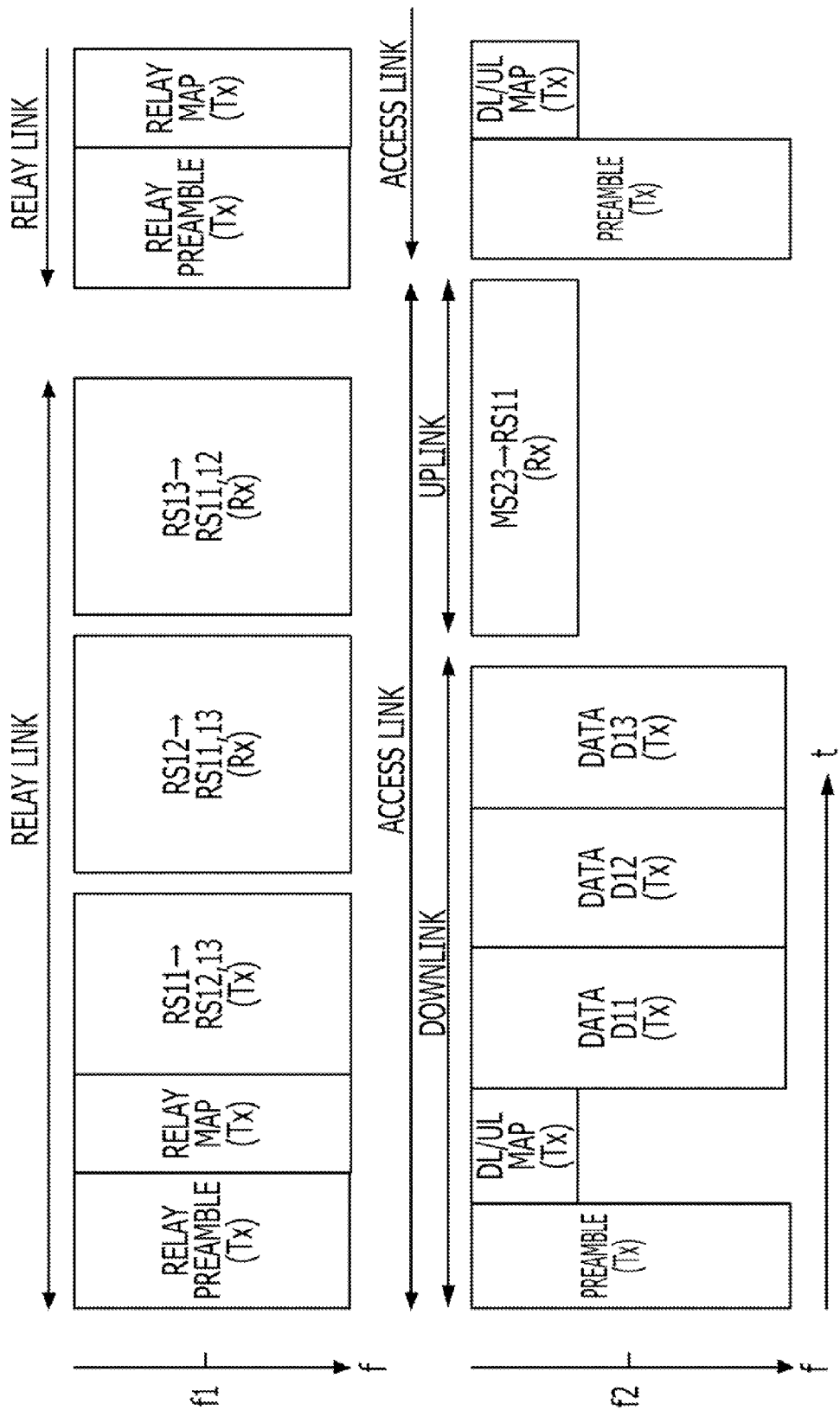
FIG. 11 illustrates a frame structure of a relay station serving as a base station according to a third embodiment.

FIG. 11 illustrates a frame structure of a relay station serving a base station in accordance with the third embodiment. The frame structure in FIG. 11 is the frame structure of the relay station 11 serving as the base station illustrated in FIG. 2.

Referring to FIG. 11, two center frequencies f1 and f2 are used for the frame of the relay station 11 serving as the base station. The center frequency f1 is used for the relay link, and the center frequency f2 is used for the access link.

As illustrated in FIG. 11, the preamble of the relay link is synchronized with the preamble of the access link. In other words, data exchange is performed at substantially the same timing in the relay link and the access link.

An operation of the relay station 11 through the relay link and the access link is substantially identical to the operation illustrated in FIG. 3 except that the operation timings are synchronized. The timing of generating the DL/UL map in accordance with the relay map is aligned with an access link at a next timing relay link subsequent to the relay link through which the relay map has been transmitted. For example, the relay station 11 generates a DL/UL map on the right-hand side in FIG. 11 in accordance with a relay map on the left-hand side in FIG. 11.

Figure 12:
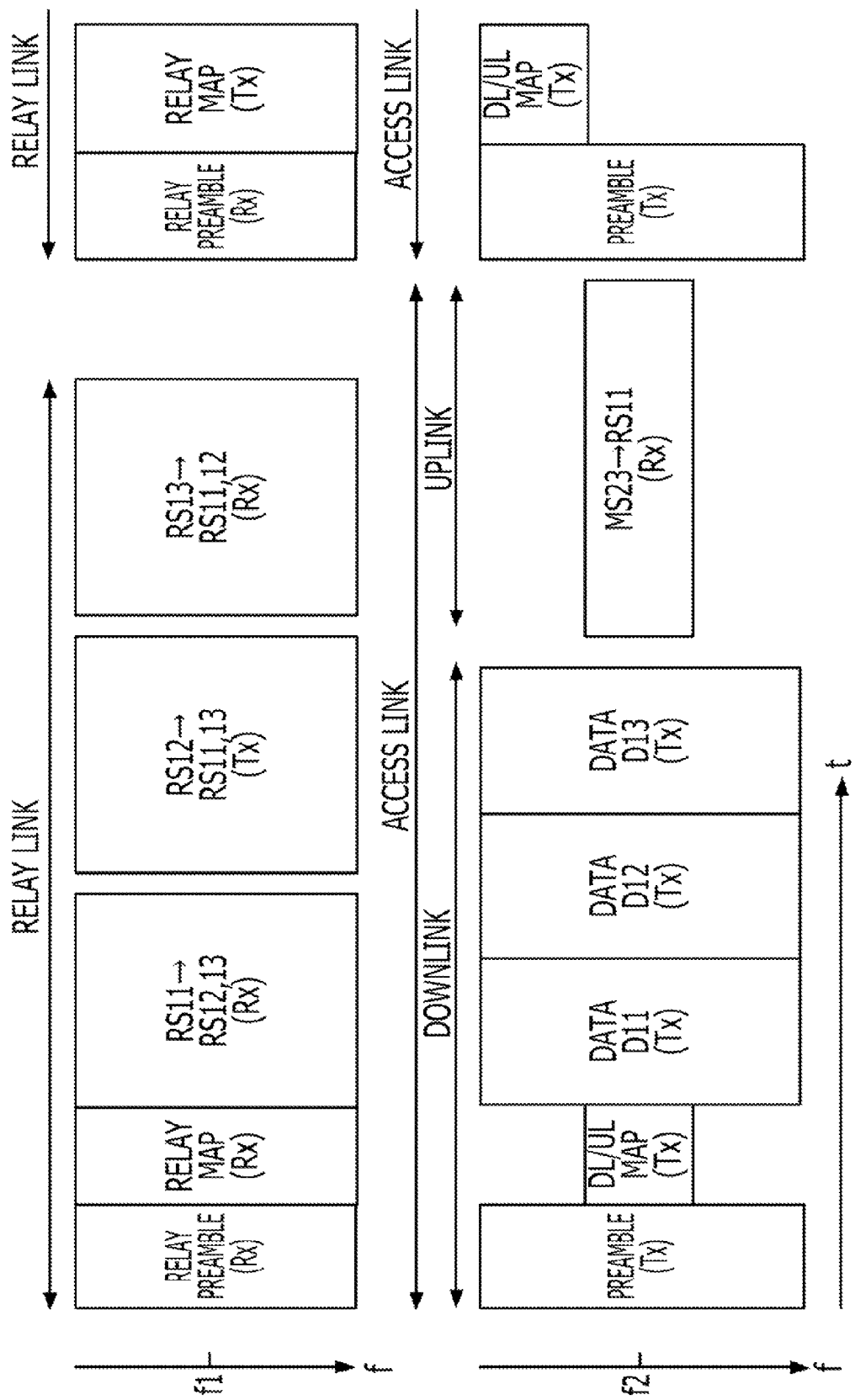
FIG. 12 illustrates a frame structure of a relay station other than the relay station serving as a base station.

FIG. 12 illustrates a frame structure of a relay station other than the relay station serving a base station. The frame structure of FIG. 12 is the frame structure of the relay station 13 not serving as a base station.

Referring to FIG. 12, two center frequencies f1 and f2 are used for the frame of the relay station 13. The center frequency f1 is used for the relay link and the center frequency f2 is used for the access link.

Referring to FIG. 12, the preamble of the relay link is synchronized with the preamble of the access link. Data exchange is performed at substantially the same timing in the relay link and the access link.

An operation of the relay station 13 through the relay link and the access link is identical to the operation illustrated in FIG. 4 except that the operation timings are synchronized. The timing of generating the DL/UL map in accordance with the relay map is aligned with an access link at a next timing relay link subsequent to the relay link through which the relay map has been transmitted. For example, the relay station 13 generates a DL/UL map on the right-hand side in FIG. 12 in accordance with a relay map on the left-hand side in FIG. 12.

Figure 13:
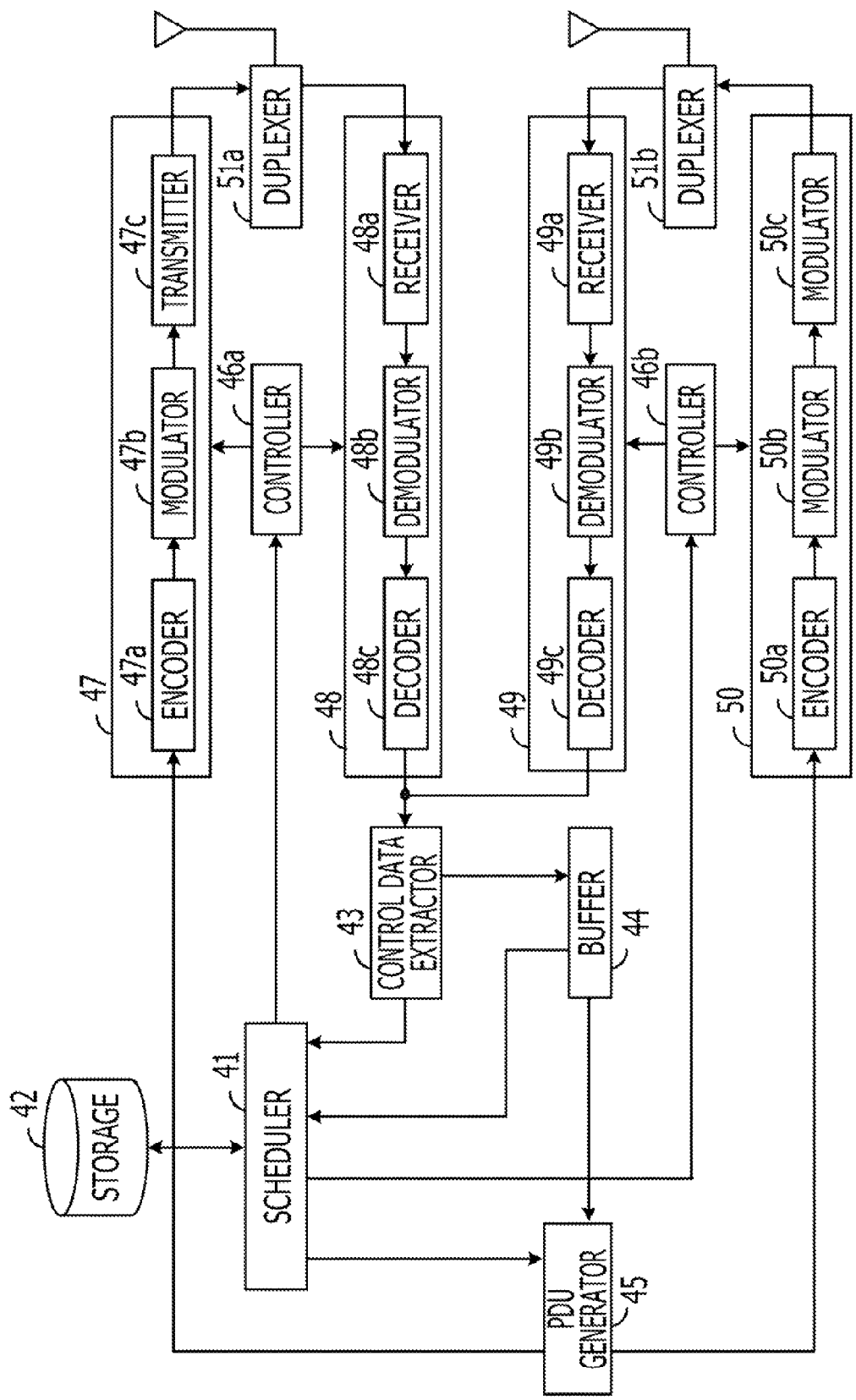
FIG. 13 is a block diagram illustrating a relay station according to the third embodiment.

FIG. 13 is a block diagram of the relay station 11 of the third embodiment. As illustrated in FIG. 13, the relay station 11 includes scheduler 41, storage 42, control data extractor 43, buffer 44, PDU generator 45, controllers 46a and 46b, relay link transmission processor 47, relay link reception processor 48, access link reception processor 49, access link transmission processor 50, and duplexers 51a and 51b. The relay stations 12 and 13 are substantially identical in block diagram to the relay station 11.

As illustrated in FIG. 13, the relay station 11 includes two antennas, one for relay link communications, and the other for access link communications. A communication processor and a reception processor are arranged for each of the antennas (for the relay link and the access link). The relay station 11 includes the relay link transmission processor 47, the relay link reception processor 48, the access link reception processor 49 and the access link transmission processor 50. The relay link transmission processor 47, the relay link reception processor 48, the access link reception processor 49, and the access link transmission processor 50 are respectively substantially identical to the transmission processor 37 and the reception processor 38 discussed with reference to FIG. 10. A controller is arranged for each of the antennas. The relay station 11 includes the controller 46a and the controller 46b.

The scheduler 41, the storage 42, the control data extractor 43, the buffer 44, and the PDU generator 45 are shared by the relay link and the access link. The process contents of these elements are respectively substantially identical to those of the scheduler 31, the storage 32, the control data extractor 33, the buffer 34, and the PDU generator 35.

The scheduler 41 controls the controller 46a to perform a relay link process, and controls the controller 46b to perform an access link process. The scheduler 41 performs a scheduling process such that the frame of the relay link and the frame of the access link are generated on different frequencies and at substantially the same timing. More specifically, the scheduler 41 generates a relay map such that the multicast data is exchanged among the relay stations 11-13 on the center frequency f1. The scheduler 41 also generates a second map such that the multicast data is broadcast to the wireless terminals 23 and 24 on the center frequency f2.

The relay stations 11-13 exchange the multicast data received from the wireless terminals 21-24 controlled by the relay stations through the relay link, and broadcast the mutually exchanged multicast data to the wireless terminals 21-24 controlled by the relay stations through the access link of another frequency. In this way, the relay stations 11-13 are free from transmitting the data received from the wireless terminals 21-24 to the relay station 11 serving as a base station and receiving substantially the same data from the relay station 11. The relay stations 11-13 simply receive the data from the wireless terminals 21 and 22. Wireless resources are thus effectively used.

All examples and conditional language recited herein are intended for pedagogical purposes to aid the reader in understanding the principles of the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment(s) of the present invention(s) has (have) been described in detail, it should be understood that the various changes, substitutions, and alterations could be made hereto without departing from the spirit and scope of the invention.

What is claimed is:

1. A relay station in a wireless communication system that includes a plurality of relay stations and a plurality of terminals, the plurality of relay stations including the relay station and at least one other relay station, each of the plurality of terminals being controlled by one of the plurality of relay stations respectively, the relay station comprising:

a receiver configured to receive a request from a receiving relay station among the at least one other relay station, the receiving relay station receiving multicast data for transmission to other terminals from a first terminal in the plurality of terminals without the multicast data being received by any of the plurality of relay stations other than the receiving relay station;

a transmitter configured to transmit first control information to each of the at least one other relay station in accordance with the request, the first control information indicating that a first wireless signal is to be broadcasted from the receiving relay station to each of the plurality of relay stations other than the receiving relay station without the first wireless signal being further transmitted by any of the plurality of relay stations other than the receiving relay station during a first period, the first wireless signal including the multicast data, wherein the transmitter is further configured to transmit second control information to the other terminals of the plurality of terminals, the other terminals being controlled by the relay station, wherein:
the second control information controls transmission of a second wireless signal from the relay station to the other terminals during a second period, and
the second wireless signal includes the multicast data that is included in the first wireless signal received during the first period.

2. The relay station according to claim 1, wherein the control information is generated by the relay station.

3. The relay station according to claim 1, wherein the second control information is generated such that the plurality of terminals receive the data using a same radio resource.

4. The relay station according to claim 1, wherein the second control information is generated by the relay station in accordance with the first control information, and wherein the second control information indicates size and order of the data.

5. The relay station according to claim 1, wherein the first wireless signal and the second wireless signal are transmitted within a radio frame.

6. The relay station according to claim 1, wherein the first control information is needed for receiving the multicast data included in the first wireless signal, and second control information is needed for the other terminals to receive the multicast data included in the second wireless signal.

7. The relay station according to claim 1, wherein the first control information comprises a first map, and second control information comprises a second map.

8. The relay station according to claim 7, wherein the second map is generated by copying the first map.

9. The relay station according to claim 1, wherein the first control information is transmitted on a first frequency, and second control information is transmitted on a second frequency.

10. The relay station according to claim 9, wherein the first frequency and the second frequency are different frequencies.

11. The relay station according to claim 1, wherein the multicast data is not aggregated with other multicast data at the relay station for sharing among the plurality of relay stations, the other multicast data being transmitted from another terminal that is controlled by another receiving relay station in the plurality of relay stations.

12. The relay station according to claim 1, wherein the multicast data is multicast to each of the other terminals via at most two of the plurality of relay stations.

13. The relay station of claim 1, wherein the request comprises at least one of a bandwidth request and a radio resource request.

14. A relay station in a wireless communication system including a plurality of relay stations and a plurality of terminals, the plurality of relay stations including the relay station, a first relay station, and at least one other relay station, each of the plurality of terminals being controlled by one of the plurality of relay stations respectively, the relay station comprising:
a receiver configured to:
receive first control information from the first relay station, the first control information indicating that a first wireless signal is to be broadcasted from a receiving relay station to each of the plurality of relay stations other than the receiving relay station without the first wireless signal being further transmitted by any of the plurality of relay stations other than the receiving relay station during a first period, the receiving relay station being one of the other relay stations which receives multicast data for transmission to other terminals from a first terminal in the plurality of terminals without the multicast data being received by any of the plurality of relay stations other than the receiving relay station, the first wireless signal including the multicast data, and
receive the first wireless signal from the receiving relay station during the first period; and
a transmitter coupled to the receiver, wherein the transmitter is configured to transmit second control information to terminals controlled by the relay station, wherein the second control information controls transmission of a second wireless signal from the relay station to the terminals controlled by the relay station during a second period, and wherein the second wireless signal includes the multicast data that is included in the first wireless signal received by the relay station during the first period.

15. The relay station according to claim 14, wherein the second control information is generated such that the terminals controlled by the relay station receive the data using a same radio resource.

16. The relay station according to claim 14, wherein the second control information is generated by the relay station in accordance with the first control information, and wherein the second control information indicates a size and an order of the multicast data.

17. The relay station according to claim 16, wherein an order and a size of the multicast data included in the first wireless signal is correspond, respectively, to an order and a size of the multicast data included in the second wireless signal.

18. The relay station according to claim 14, wherein the first control information is generated by the first relay station.

19. A relay station in a wireless communication system that includes a plurality of relay stations and a plurality of terminals, the plurality of relay stations including the relay station, a first relay station, and at least one other relay station, each of the plurality of terminals being controlled by one of the plurality of relay stations respectively, the relay station comprising:
a transmitter configured to transmit a request to the first relay station;
a receiver configured to:
receive first control information, the first control information transmitted from the first relay station in accordance with the request and indicating that a first wireless signal is to be broadcasted from a receiving relay station to each of the plurality of relay stations other than the receiving relay station without the first wireless signal being further transmitted by any of the plurality of relay stations other than the receiving relay station during a first period, the first wireless signal including multicast data received by a receiving relay station from a first terminal of the plurality of terminals for transmission to other terminals of the plurality of terminals without the multicast data being received by any of the plurality of relay stations other than the receiving relay station during a first period, and
receive multicast data from the receiving relay station during the first period,
wherein the transmitter is further configured to transmit second control information to terminals controlled by the relay station, wherein the second control information controls transmission of a second wireless signal from the relay station to the terminals controlled by the relay station during a second period, and wherein the second wireless signal includes the multicast data that is included in the first wireless signal received by the relay station during the first period.

20. The relay station according to claim 19, wherein the first control information is generated by the first relay station.

* * * * *